(12) United States Patent
Nuthakki et al.

(10) Patent No.: US 12,189,997 B2
(45) Date of Patent: Jan. 7, 2025

(54) HOST AGENT-ASSISTED DETECTION OF MALICIOUS ATTACK ON STORAGE ARRAY

(71) Applicant: DELL PRODUCTS L.P., Hopkinton, MA (US)

(72) Inventors: Krishna Deepak Nuthakki, Bangalore (IN); Tomer Shachar, Beer-Sheva (IL); Sunil Kumar, Bangalore (IN); Arieh Don, Newton, MA (US)

(73) Assignee: DELL PRODUCTS L.P., Hopkinton, MA (US)

( * ) Notice: Subject to any disclaimer, the term of this patent is extended or adjusted under 35 U.S.C. 154(b) by 225 days.

(21) Appl. No.: 17/951,225

(22) Filed: Sep. 23, 2022

(65) Prior Publication Data
US 2024/0104208 A1 Mar. 28, 2024

(51) Int. Cl.
*G06F 3/06* (2006.01)
*G06F 11/30* (2006.01)
(Continued)

(52) U.S. Cl.
CPC ........... *G06F 3/0673* (2013.01); *G06F 3/061* (2013.01); *G06F 11/3006* (2013.01);
(Continued)

(58) Field of Classification Search
CPC ............ G06F 11/3006; G06F 9/45558; G06F 16/256; G06F 11/3051; G06F 11/3409; G06F 11/301; G06F 11/30; G06F 11/3093; G06F 16/951; G06F 21/44; G06F 3/0622; G06F 21/568; G06F 21/33; G06F 3/0634; G06F 21/554; G06F 21/567; G06F 3/0673; G06F 21/316; G06F 21/552; G06F 21/566; G06F 3/061; G06F 3/0653; G06F 3/0689; G06F 9/5022; G06F 9/547; G06F 9/5077; G06F 9/5016; G06F 11/0751; G06F 11/302; H04L 43/20; H04L 41/5058; H04L 41/046; H04L 41/0895; H04L 43/14; H04L 41/0853; H04L 41/40; H04L 63/1416; H04L 41/0663; H04L 43/0805; H04L 69/40; H04L 41/0816; H04L 41/0806;
(Continued)

(56) References Cited

U.S. PATENT DOCUMENTS 8,341,377 B2 * 12/2012 Chan ................. G06F 3/061
711/170
9,998,339 B1 * 6/2018 Brajkovic ........... G06F 11/3006
(Continued)

*Primary Examiner* — Kyung H Shin
(74) *Attorney, Agent, or Firm* — Anderson Gorecki LLP

(57) ABSTRACT

Host agents running on host servers provide current and historic host application awareness information to a storage array. The storage array uses the historic host application awareness information to train a host application-specific model of IO characteristics. The current host application awareness information and observed IO characteristics are used as inputs to the model to detect malicious activity. The current and historic host application awareness information includes host application roles such as normal operation, creation of a remote backup, cloning of the storage object, snapping of the storage object, restoring the storage object from a snapshot, scanning a database in the storage object, and scanning the storage object.

20 Claims, 4 Drawing Sheets

(51) Int. Cl.
  *G06F 13/20* (2006.01)
  *G06F 21/31* (2013.01)
  *G06F 21/56* (2013.01)
  *H04L 9/40* (2022.01)
  *H04L 41/0663* (2022.01)

(52) U.S. Cl.
  CPC ............ *G06F 13/20* (2013.01); *G06F 21/316* (2013.01); *G06F 21/566* (2013.01); *H04L 41/0663* (2013.01); *H04L 63/1425* (2013.01); *G06F 2213/40* (2013.01); *G06F 2221/034* (2013.01)

(58) Field of Classification Search
  CPC . H04L 41/0668; H04L 41/0677; H04L 67/10; H04L 41/12; H04L 41/0661; H04L 63/1425; H04L 43/065; G06N 20/00
  See application file for complete search history.

(56) References Cited

U.S. PATENT DOCUMENTS

| | | | |
|---|---|---|---|
| 10,972,355 B1* | 4/2021 | Bauer | H04L 41/0663 |
| 2009/0199296 A1* | 8/2009 | Xie | G06F 21/316 726/23 |
| 2018/0075236 A1* | 3/2018 | Kwon | G06F 3/0673 |
| 2021/0160265 A1* | 5/2021 | Chittaro | H04L 63/1425 |

* cited by examiner

HOST AGENT-ASSISTED DETECTION OF MALICIOUS ATTACK ON STORAGE ARRAY

TECHNICAL FIELD

The subject matter of this disclosure is generally related to threat detection for data storage systems.

BACKGROUND

Block-based storage arrays and some other types of Storage Area Networks (SANs) maintain logical storage objects for storing host application data that is used by instances of host applications running on host servers. Examples of host applications may include but are not limited to, software for email, accounting, inventory control, manufacturing, engineering, and a wide variety of other institutional functions. An individual storage array may simultaneously support multiple host applications. Separate groups of storage objects are created for each host application. Each host application-specific storage object may be accessed by multiple instances of the associated host application using input-output commands (IOs). The storage objects, which are abstractions of space on physical storage drives, include contiguous ranges of logical block addresses (LBAs) at which blocks of host application data can be stored. IOs from instances of host applications typically designate the storage object name and LBAs to be read or written because a block-based storage system is unaware of data structures such as databases and files within the host application data.

SUMMARY

In accordance with some implementations, a method comprises: receiving, by a storage array from a plurality of host agents running on host servers, current host application awareness information comprising at least one host application role of a plurality of host application roles performed by instances of a host application; observing, by the storage array, characteristics of input-output operations (IOs) by instances of the host application to access at least one storage object maintained for the host application by the storage array; and using the current host application awareness information and the observed characteristics of IOs by instances of the host application to access the at least one storage object as inputs to a host application-specific model to predict that the at least one storage object is a target of malicious access activity.

In accordance with some implementations an apparatus comprises: non-volatile drives with storage space mapped to a storage object; and at least one compute node configured to: manage access to the non-volatile drives; receive, from a plurality of host agents running on host servers, current host application awareness information comprising at least one host application role of a plurality of host application roles performed by instances of a host application; observe characteristics of input-output operations (IOs) by instances of the host application to access at least one storage object maintained for the host application by the storage array; and use the current host application awareness information and the observed characteristics of IOs by instances of the host application to access the at least one storage object as inputs to a host application-specific model to predict that the at least one storage object is a target of malicious access activity.

In accordance with some implementations, a non-transitory computer-readable storage medium stores instructions that when executed by a computer cause the computer to perform a method comprising: receiving, by a storage array from a plurality of host agents running on host servers, current host application awareness information comprising at least one host application role of a plurality of host application roles performed by instances of a host application; observing, by the storage array, characteristics of input-output operations (IOs) by instances of the host application to access at least one storage object maintained for the host application by the storage array; and using the current host application awareness information and the observed characteristics of IOs by instances of the host application to access the at least one storage object as inputs to a host application-specific model to predict that the at least one storage object is a target of malicious access activity.

Other aspects, features, and implementations may become apparent in view of the detailed description and figures. All examples, aspects and features can be combined in any technically possible way.

DETAILED DESCRIPTION

Aspects of the inventive concepts are described as being implemented in a data storage system that includes a host server and a storage array that may be characterized as a SAN. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
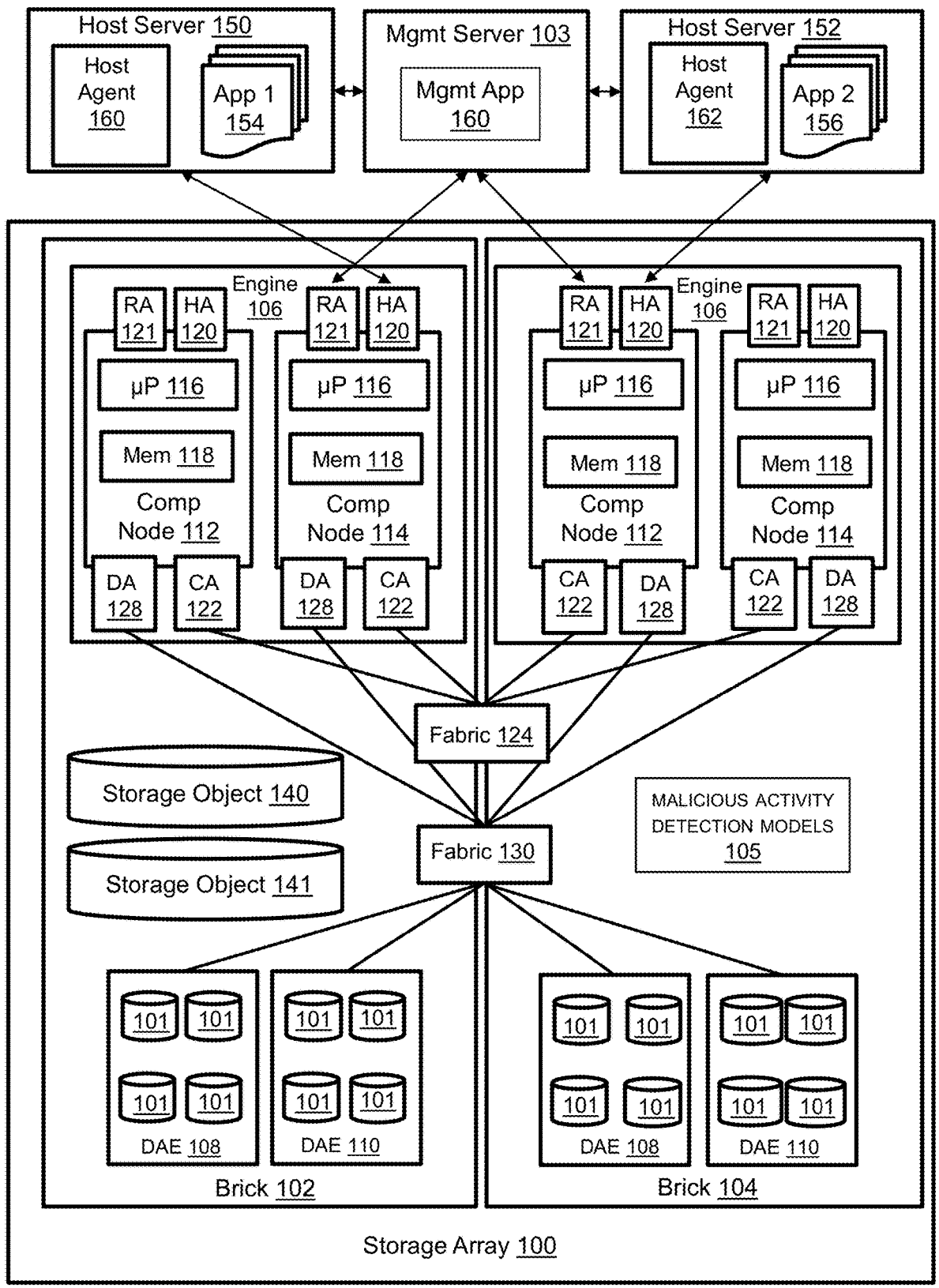
FIG. 1 illustrates a storage array that uses application awareness information from host agents to train and use malicious activity detection models.

FIG. 1 illustrates a storage array 100 that uses application awareness information from host agents 160, 162 to train and use malicious activity detection models 105. The storage array is depicted in a simplified environment supporting two host servers 150, 152. Each host server includes microprocessors and memory for running instances of one of two host applications, namely App 1 (154) and App 2 (156). The storage array 100 includes one or more bricks 102, 104. Each brick includes an engine 106 and one or more drive array enclosures (DAEs) 108, 110. Each DAE includes managed drives 101 of one or more technology types. Examples may include, without limitation, solid-state drives (SSDs) such as flash and hard disk drives (HDDs) with spinning disk storage media. Each DAE might include many more managed drives than illustrated. Each engine 106 includes a pair of interconnected compute nodes 112, 114, which may be referred to as "storage directors." Each compute node includes hardware resources such as at least one multi-core processor 116 and local memory 118. The processor may include Central Processing Units (CPUs), Graphics Processing Units (GPUs), or both. The local memory 118 may include volatile Random-Access Memory (RAM) of any type, Non-Volatile Memory (NVM) such as Storage Class Memory (SCM), or both. Each compute node includes one or more host adapters (HAs) 120 for communicating with the host servers 150, 152. Each HA has hardware resources for servicing IOs, e.g., processors, volatile memory, and ports via which the hosts may access the SAN node. Each compute node also includes a remote adapter (RA) 121 for communicating with a management server 103 and other storage systems. Each compute node also includes one or more drive adapters (DAs) 128 for communicating with the managed drives 101 in the DAEs 108, 110. Each drive adapter has hardware resources for servicing IOs, e.g., processors, volatile memory, and ports via which the computing node may access the DAEs. Each compute node may also include one or more channel adapters (CAs) 122 for communicating with other compute nodes via an interconnecting fabric 124. An operating system (OS) running on the SAN has resources for servicing IOs and supports a wide variety of other functions. Each compute node may allocate a portion or partition of its respective local memory 118 to a shared memory that can be accessed by other compute nodes, e.g., via Direct Memory Access (DMA) or Remote DMA (RDMA). The paired compute nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN can access every managed drive 101 in the SAN.

Data used by instances of the host applications 154, 156 running on the host servers 150, 152 is maintained on the managed drives 101. The managed drives 101 are not discoverable by the host servers 150, 152 but the storage array 100 creates production storage objects 140, 141 that can be discovered and accessed by the host servers. The production storage objects are logical storage devices that may be referred to as production volumes, production devices, or production LUNs, where Logical Unit Number (LUN) is a number used to identify logical storage volumes in accordance with the Small Computer System Interface (SCSI) protocol. From the perspective of the host servers 150, 152, each storage object 140, 141 is a single drive having a set of contiguous fixed-size logical block addresses (LBAs) on which data used by instances of a host application resides. However, the host application data is stored at non-contiguous addresses on various managed drives 101. The data used by instances of an individual host application may be maintained on one storage object or a group of storage objects that can be accessed by all instances of that host application. In the illustrated example, storage object 140 is used exclusively by instances of host application 154 and storage object 141 is used exclusively by instances of host application 156. To service IOs from instances of a host application, the storage array 100 maintains metadata that indicates, among various things, mappings between LBAs of the production storage objects 140, 141 and addresses with which extents of host application data can be accessed from the shared memory and managed drives 101.

Compute nodes of the storage array use application awareness information from host agents 160, 162 running on the hosts to train and use malicious activity detection models 105. As will be explained in greater detail below, the host agents and possibly a management application 160 running on the management server 103 collect application awareness information that characterizes various normal IO activities of the host application instances. The storage array uses the application awareness information to build separate malicious activity detection models for each host application. Each host application-specific model is used to detect malicious access to the storage objects used by that host application.

Figure 2:
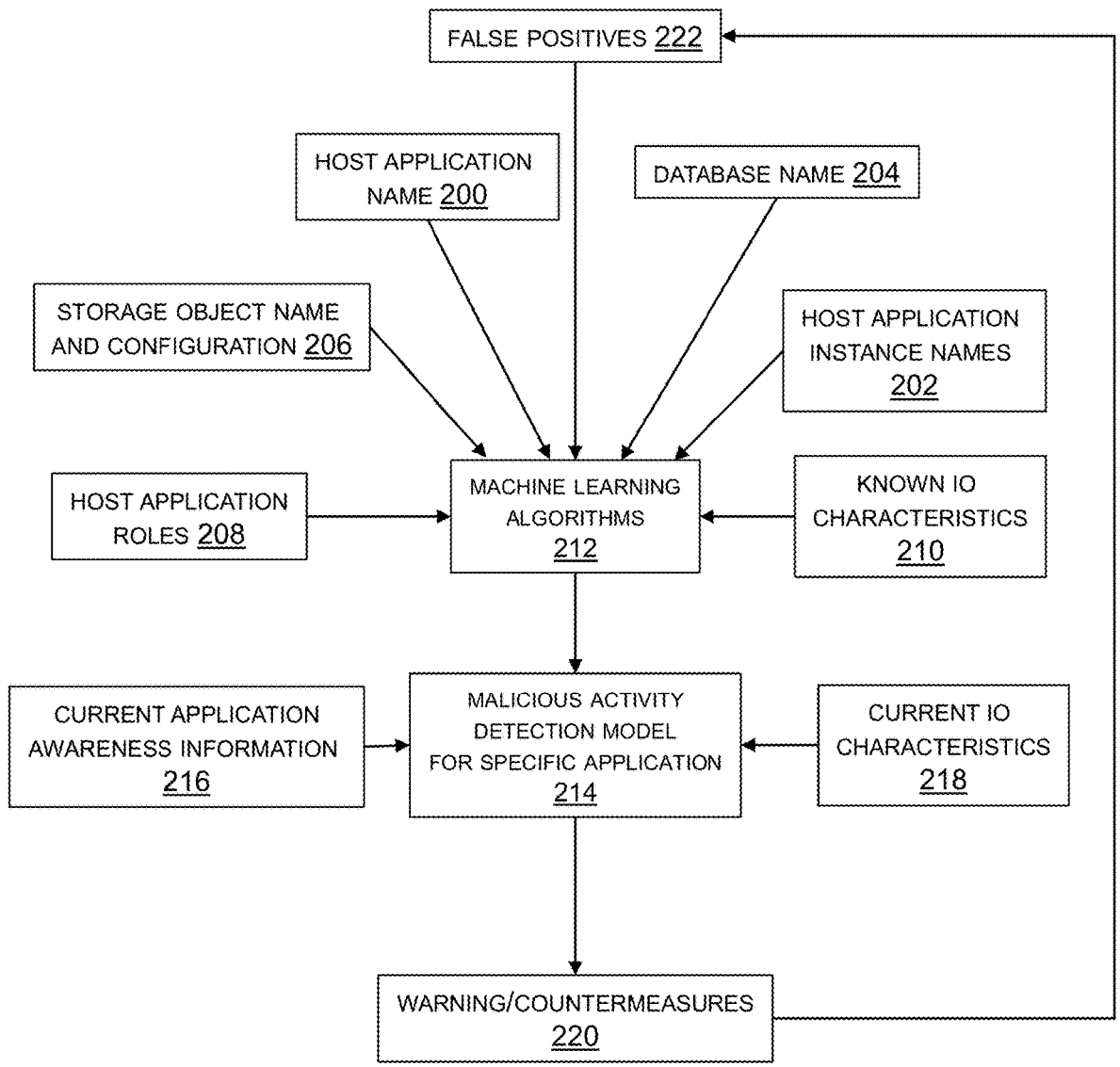
FIG. 2 illustrates training of a malicious activity detection model.

FIG. 2 illustrates training of a malicious activity detection model. Historic host application awareness information gathered over a period of time in the absence of malicious activity is provided to the storage array by the host agents as input to machine learning algorithms 212. The historic host application awareness information may include one or more of host application name 200, host application instance names 202, accessed database (or other data structure) name 204, storage object name and configuration 206, host application roles 208, and known IO characteristics 210 of the host application such as read/write ratio, LBAs accessed, time, and date. Host application instances may generate IOs with characteristics that differ depending on the role being performed by the host application instance, where each role corresponds to a task. Examples of roles may include, but are not limited to, normal operation (performing the primary function of the host application), creation of remote backup to cloud, cloning or snapping a storage object, restoring a storage object from a snapshot, scanning a database, and scanning a storage object (e.g., antivirus scan). The host application roles can be correlated with other characteristics such as read-write ratio. For example, a snap copy restored into a production storage object will have close to 100% read IO activity, whereas the production storage object into which the snap is being restored will have close to 100% write IO activity. A snap copy used for backup may have close to 100% read IO activity to sequential LBAs. An Exchange storage object may have close to 100% random access in normal operation. An Oracle Log storage object has mostly sequential write IO activity (read IOs may happen when the DB verifies the log viability). Consequently, training a malicious activity model 214 with host application roles 208 in addition to other application awareness information helps to create a more accurate model that is less likely to generate false positive or fail to detect malicious activity because the range of predicted operation does not include performance of all roles at all times. The machine learning algorithms 212 train a malicious activity detection model for a specific host application 214 using the historic host application awareness information.

Current host application awareness information 216 and current IO characteristics 218 associated with the storage objects maintained for that host application are used by the compute nodes to detect malicious activity. The current host application awareness information 216 may be provided to the storage array by the host agents. The current IO characteristics 218 associated with the storage objects may be monitored by the storage array. Detection of malicious activity prompts generation of a warning and/or countermeasures 220. In the event that the detection of malicious activity is a false positive 222, the host application awareness information and IO characteristics associated with the false positive application may be used to update the model.

Figure 3:
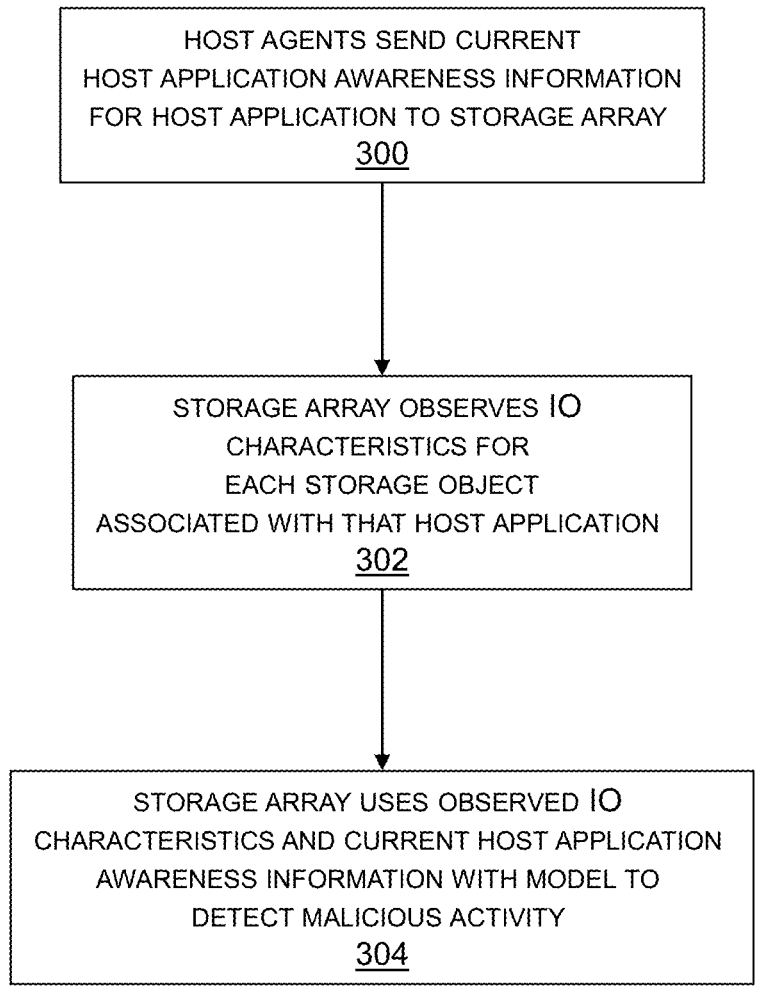
FIG. 3 illustrates use of a malicious activity detection model.

FIG. 3 illustrates use of a malicious activity detection model by the compute nodes of the storage array. In step 300 the host agents send current host application awareness information for a host application to the storage array. In step 302 the storage array observes the IO characteristics of the production storage objects used by instances of that host application. The observed IO characteristics may include one or more of read/write ratio, IO size, IO dispersion (e.g., randomness or sequentially), and IOPS (or IOs per other unit of time). In step 304 the storage array uses the observed IO characteristics of those storage objects and the current host application awareness information for the application as inputs to the malicious activity detection model for that host application. As mentioned above, detection of malicious activity prompts generation of a warning and/or countermeasures.

Figure 4A:
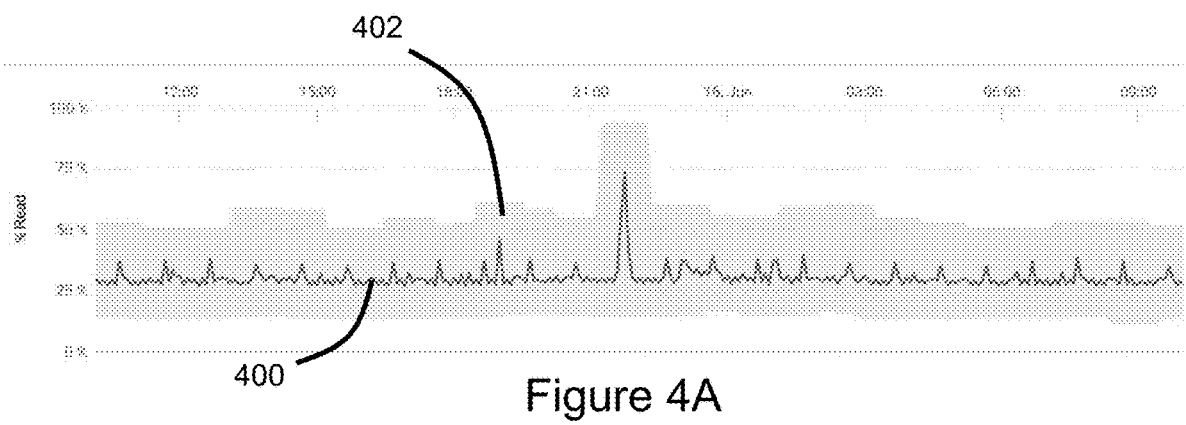
FIGS. 4A and 4B illustrate detection of malicious activity using a malicious activity detection model.
Figure 4B:
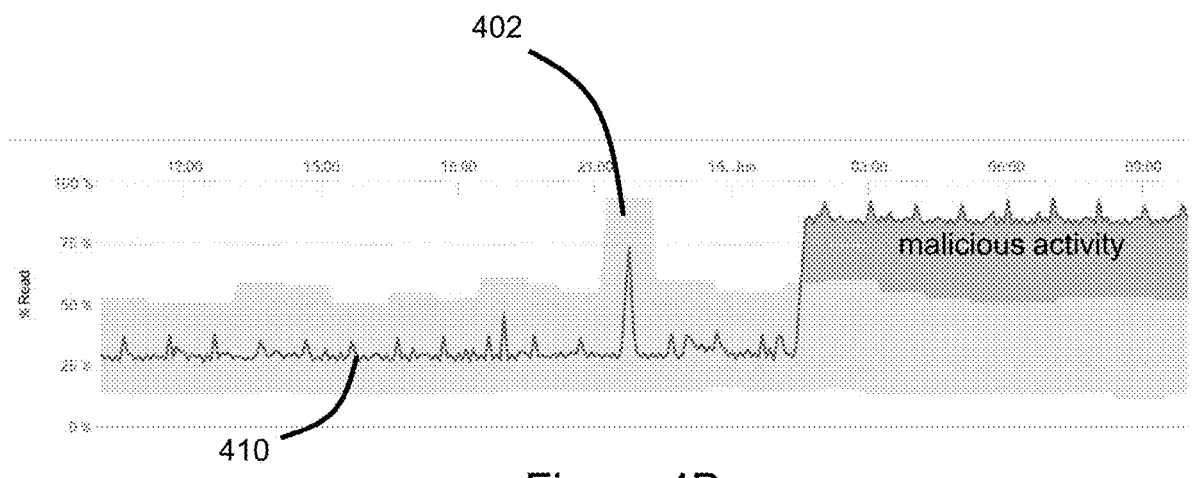

FIGS. 4A and 4B illustrate detection of malicious activity using a malicious activity detection model. FIG. 4A specifically illustrates a current IO characteristic 400, namely read %, within a range 402 predicted by the model to be expected and thus non-malicious. FIG. 4B specifically illustrates a current IO characteristic 410, namely read %, moving outside a range 412 predicted by the model to be expected and thus being malicious activity starting at 2 AM.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
receiving, by a storage array from a plurality of host agents running on host servers, current host application awareness information comprising at least one host application role of a plurality of host application roles performed by instances of a host application;
observing, by the storage array, characteristics of input-output operations (IOs) by instances of the host application to access at least one storage object maintained for the host application by the storage array; and
using the current host application awareness information and the observed characteristics of IOs by instances of the host application to access the at least one storage object as inputs to a host application-specific model to predict that the at least one storage object is a target of malicious access activity.

2. The method of claim 1 further comprising the plurality of host agents providing host application roles including at least one of normal operation, creation of a remote backup, cloning of the storage object, snapping of the storage object, restoring the storage object from a snapshot, scanning a database in the storage object, and scanning the storage object.

3. The method of claim 2 further comprising the storage array observing characteristics of IOs including read/write ratio, IO size, IO dispersion, and IOs per unit time.

4. The method of claim 1 further comprising receiving, by a storage array from a plurality of host agents running on host servers, historic host application awareness information for the host application gathered over a period of time in an absence of malicious activity.

5. The method of claim 4 further comprising including in the historic host application awareness information the name of the host application, host application instance names, known IO characteristics of the host application, accessed data structure name, and name of the storage object.

6. The method of claim 5 further comprising training the host application-specific model with the historic host application awareness information.

7. The method of claim 6 further comprising retraining the model with host application awareness information and observed characteristics of IOs associated with a false positive detection of malicious activity.

8. An apparatus comprising:
non-volatile drives with storage space mapped to a storage object; and
at least one compute node with a microprocessor and memory configured to:
manage access to the non-volatile drives;
receive, from a plurality of host agents running on host servers, current host application awareness information comprising at least one host application role of a plurality of host application roles performed by instances of a host application;
observe characteristics of input-output operations (IOs) by instances of the host application to access at least one storage object maintained for the host application by the storage array; and
use the current host application awareness information and the observed characteristics of IOs by instances of the host application to access the at least one storage object as inputs to a host application-specific model to predict that the at least one storage object is a target of malicious access activity.

9. The apparatus of claim 8 further comprising the plurality of host agents configured to provide host application roles including at least one of normal operation, creation of a remote backup, cloning of the storage object, snapping of the storage object, restoring the storage object from a snapshot, scanning a database in the storage object, and scanning the storage object.

10. The apparatus of claim 9 further comprising the compute node configured to observe characteristics of IOs including read/write ratio, IO size, IO dispersion, and IOs per unit time.

11. The apparatus of claim 8 further comprising the compute node configured to receive historic host application awareness information for the host application gathered over a period of time in an absence of malicious activity.

12. The apparatus of claim 11 further comprising the historic host application awareness information including the name of the host application, host application instance names, known IO characteristics of the host application, accessed data structure name, and name of the storage object.

13. The apparatus of claim 12 further comprising the compute node configured to train the host application-specific model with the historic host application awareness information.

14. The apparatus of claim 13 further comprising the compute node configured to retrain the model with host application awareness information and observed characteristics of IOs associated with a false positive detection of malicious activity.

15. A non-transitory computer-readable storage medium storing instructions that when executed by a computer cause the computer to perform a method comprising:
receiving, by a storage array from a plurality of host agents running on host servers, current host application awareness information comprising at least one host application role of a plurality of host application roles performed by instances of a host application;
observing, by the storage array, characteristics of input-output operations (IOs) by instances of the host application to access at least one storage object maintained for the host application by the storage array; and
using the current host application awareness information and the observed characteristics of IOs by instances of the host application to access the at least one storage object as inputs to a host application-specific model to predict that the at least one storage object is a target of malicious access activity.

16. The non-transitory computer-readable storage medium of claim 15 in which the method further comprises the plurality of host agents providing host application roles including at least one of normal operation, creation of a remote backup, cloning of the storage object, snapping of the storage object, restoring the storage object from a snapshot, scanning a database in the storage object, and scanning the storage object.

17. The non-transitory computer-readable storage medium of claim 16 in which the method further comprises the storage array observing characteristics of IOs including read/write ratio, IO size, IO dispersion, and IOs per unit time.

18. The non-transitory computer-readable storage medium of claim 15 in which the method further comprises receiving, by a storage array from a plurality of host agents running on host servers, historic host application awareness information for the host application gathered over a period of time in an absence of malicious activity.

19. The non-transitory computer-readable storage medium of claim 18 in which the method further comprises including in the historic host application awareness information the name of the host application, host application instance names, known IO characteristics of the host application, accessed data structure name, and name of the storage object.

20. The non-transitory computer-readable storage medium of claim 19 in which the method further comprises training the host application-specific model with the historic host application awareness information.

* * * * *